United States Patent [19]

Lebourg

[11] 3,725,609

[45] Apr. 3, 1973

[54] SYSTEM FOR MAGNETIC RECORDING AND REPRODUCING OF A SIGNAL BY MEANS OF A FREQUENCY-MODULATED RECTANGULAR WAVE

[75] Inventor: Pierre Lebourg, Paris, France

[73] Assignee: Thomson-CSF, Paris, France

[22] Filed: Apr. 7, 1971

[21] Appl. No.: 131,857

[30] Foreign Application Priority Data

Apr. 28, 1970 France..............................7015526

[52] U.S. Cl...................179/100.2 K, 179/100.2 S, 340/174.1 B

[51] Int. Cl.............................G11b 5/44, G11b 5/06

[58] Field of Search..179/100.2, 100.2 R, 100.2 MD, 179/100.2 S, 100.2 K; 340/174.1, 174.1 A, 174.1 B, 15.5 TG, 33

[56] References Cited

UNITED STATES PATENTS

| | | | |
|---|---|---|---|
| 2,713,677 | 7/1955 | Scott | 179/100.2 S |
| 2,950,352 | 8/1960 | Belck | 179/100.2 R |
| 3,418,433 | 12/1968 | Hodge | 179/100.2 R |
| 3,041,415 | 6/1962 | Gratain | 179/100.2 S |
| 2,840,800 | 6/1958 | Chester | 340/174.1 P |
| 2,950,459 | 8/1960 | Loper | 340/15.5 TG |

*Primary Examiner*—Bernard Konick
*Assistant Examiner*—Jay P. Lucas
*Attorney*—Cushman, Darby & Cushman

[57] ABSTRACT

A magnetic tape recording and playback system wherein, to avoid errors in the reproduced signal caused by the wow of both the recording and playback apparatus, the electrical signal to be recorded frequency modulates a pulse train and is recorded on magnetic tape together with a constant frequency pulse signal, both recorded signals are demodulated and fed to an analogue divider circuit delivering a signal proportional to the ratio between the frequencies of frequency modulated and the constant frequency pulses.

5 Claims, 4 Drawing Figures

SYSTEM FOR MAGNETIC RECORDING AND REPRODUCING OF A SIGNAL BY MEANS OF A FREQUENCY-MODULATED RECTANGULAR WAVE

The present invention relates to a system for magnetic recording and playback of an electrical signal in the form of frequency modulated pulses and concerns, in particular, those systems which use slow recording and fast playback of the recorded signal.

Systems of this kind are generally used for recording relatively slow variations in a physical parameter transformable into an electrical signal by means of a known transducer. In geophysics and/or meteorology for example, it is required to observe diurnal or even slower variations of certain parameters such as magnetic fields, ambient temperature or humidity, athmospheric pressure at locations which might not always be easily accessible. Such variations being relatively slow, it is desirable to record them on slow-moving magnetic tape. However, it is often required that information thus recorded should be retrieved much more rapidly to be recorded graphically or fed to a data handling system, for example, i.e., the playback tape speed of such a system should be considerably higher than the recording one.

It is moreover desired that such a system or at least the recording part thereof, should be a relatively low cost, light weight and autonomous (preferably battery powered) one, i.e., using as many commercially available mechanical and electromagnetic elements of the well known cassette-type tape recording and reproducing devices, for example.

Such recording and reproducing systems are all more or less affected by random variations of the tape speed which gives rise to spurious frequency modulation of the reproduced signal, a phenomenon which is called "-wow" for slow random variations (up to 10 cps) and "-flutter" for faster ones.

In the present case, we are mainly concerned by the slow variations of tape speed as the electrical signal corresponding to the physical parameters measured is most usually in the low and very low frequency range and, when frequency modulated pulses are recorded and reproduced, wow will obviously produce erroneous results.

Methods generally used for reducing wow are relatively costly such as, for example, using for the tape drive a synchronous or synchronized motor fed by a stabilized frequency a.c. voltage.

The system according to the invention makes it possible to automatically reduce the effects of wow in the reproduced output signal while using normal tape drives.

According to the invention, there is provided a magnetic recording and reproducing system including means for recording an electrical input signal on magnetic tape and means for reproducing from said tape an output signal corresponding to said input signal;

said recording means comprising:

first means for driving said tape with a predetermined average recording speed;

means for generating pulses frequency modulated by said input electrical signal, about a pretetermined center frequency;

a first bistable multivibrator symmetrically triggered by said frequency modulated pulses, delivering a frequency modulated rectangular waveform;

a first magnetic recording head for recording said rectangular waveform on a first track of said tape;

means for generating constant frequency pulses;

a second bistable multivibrator symmetrically triggered by said constant frequency pulses delivering a constant frequency square wave;

a second magnetic recording head for recording said square wave on a second track of said tape parallel to said first track; and said reproducing means comprising:

second means for driving said tape with a predetermined average reproducing speed;

a first magnetic reproducing head for reproducing from said first track a first reproduced pulse waveform alternately comprising positive and negative pulses respectively corresponding to the positive and negative-going transitions of said recorded rectangular waveform;

first means for generating pulses of constant amplitude and width fed by said first waveform;

a first pulse rate detector for delivering a signal proportional to the repetition frequency of the pulses delivered by said first pulse generating means;

a second magnetic reproducing head for reproducing from said second track a second reproduced pulse waveform alternately comprising positive and negative pulses respectively corresponding to the positive and negative-going transitions of said recorded square wave;

second means for generating pulses of constant amplitude and width fed by said second waveform;

a second pulse rate detector for delivering a signal proportional to the repetition frequency of the pulses delivered by said second pulse generating means; and an electronic analogue divider respectively fed by said first and said second pulse rate detectors for delivering said output signal, the latter presenting an amplitude versus time function proportional to within a constant to that of the input signal with a time scale corresponding to that of the input signal multiplied by the ratio of said reproducing to said recording average tape speeds, whereby said output signal is delivered substantially free from wow.

The invention will be described by way of example with reference to the accompanying drawings, wherein.

Figure 1:
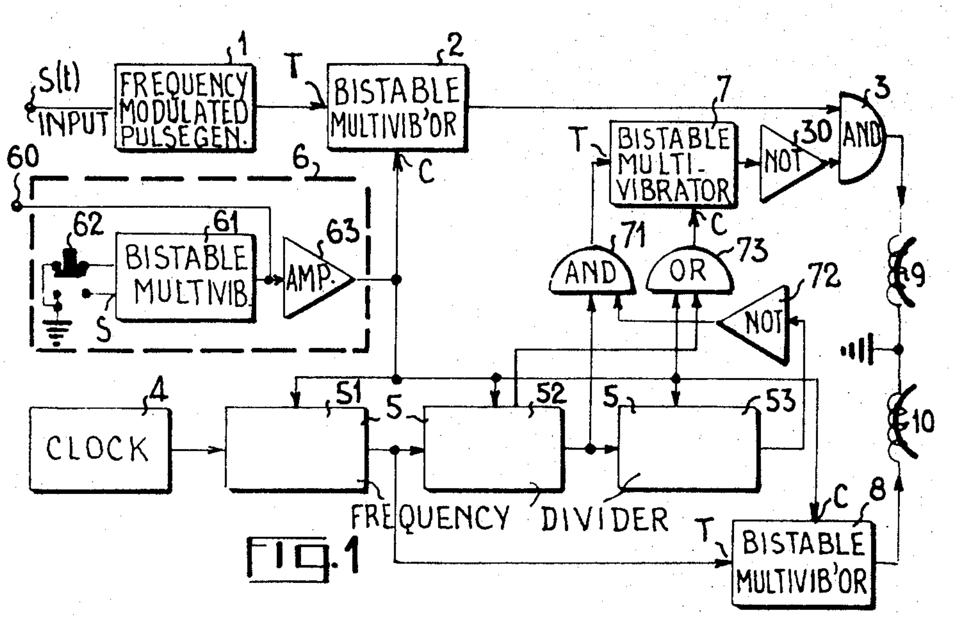
FIG. 1 is a block diagram of an embodiment of the recording section of the system in accordance with the invention.

In FIG. 1, the input signal S(t) is applied to the modulating input of a frequency modulated pulse generator 1. This input signal S(t) can be delivered by a known transducer transforming a time-varying physical quantity to be measured into a corresponding electrical signal. A simple embodiment of such a pulse generator 1 can be obtained by varying the bias of an astable multivibrator or that of a blocking oscillator in accordance with the input signal S(t). As the frequency vs.voltage characteristic of such a simple device is non-linear (i.e., substantially logarithmic), it is necessary to linearize it either by passing the input signal through a non-linear element (having a substantially exponential output vs. input characteristic) to compensate for this non-linearity or by linearizing, by means of a constant current source (such as a constant bias transistor) the discharge waveform of the coupling capacitors connected to the control electrodes whose bias is varied in accordance with S(t). An unsymmetrical astable multivibrator can be used having two different coupling capacitor discharge time constants, the first one being stable and short for delivering a short pulse and the second, long one determining the frequency, can be the product of the coupling capacitor and the variable resistance of a constant current source connected between the junction of the coupling capacitor and the control electrode of one the active elements and the source delivering a variable bias proportional to S(t).

Another embodiment of such a frequency modulated generator can be obtained by replacing the resistance, through which the abovementioned coupling capacitor is discharged, by a voltage controlled resistor such as a field effect transistor whose bias is varied in accordance with the input signal S(t). Other known frequency modulating circuits can also be used here, such as frequency modulated oscillators with voltage controlled variable resistance or impedance elements used respectively in their feedback or tuned circuits. These oscillators deliver a sinusoidal output wave, and they are generally used for triggering a monostable pulse generator, eventually after frequency division.

The output signal of the generator takes the form of constant amplitude pulses whose instantaneous frequency as a function of time is given by the expression:

$$f(t) = f_0\,[1 + k \cdot S(t)] \qquad (1)$$

where $f_0$ is the center frequency for $S(t) = 0$, $S(t)$ is the input signal to be recorded and k is a constant. These pulses are shown in graph A of FIG. 3.

The output of the generator 1 is connected to the triggering input T of a first symmetrically triggered bistable multivibrator 2. Such a multivibrator (for example of the J – K type) has two stable states, each input pulse triggering a transition from one to the other and its output delivers, in response to pulses shown in graph A of FIG. 3, a rectangular waveform as shown in graph B of FIG. 3.

This output of bistable multivibrator 2 is connected to a first input of an AND gate 3 whose output feeds a first recording head 9. The second input of AND gate 3 receives a timing signal through an inverter 30 and it operates as a NAND gate for the output signal of multivibrator 2, blocking its passage towards the first recording head 9 for the duration of the timing signal.

A clock 4 for delivering a constant frequency signal can advantageously comprise a crystal controlled oscillator having a very stable frequency. This clock signal is applied to the input of a frequency divider chain 5 comprising three consecutive stages 51, 52 and 53.

Figure 3:
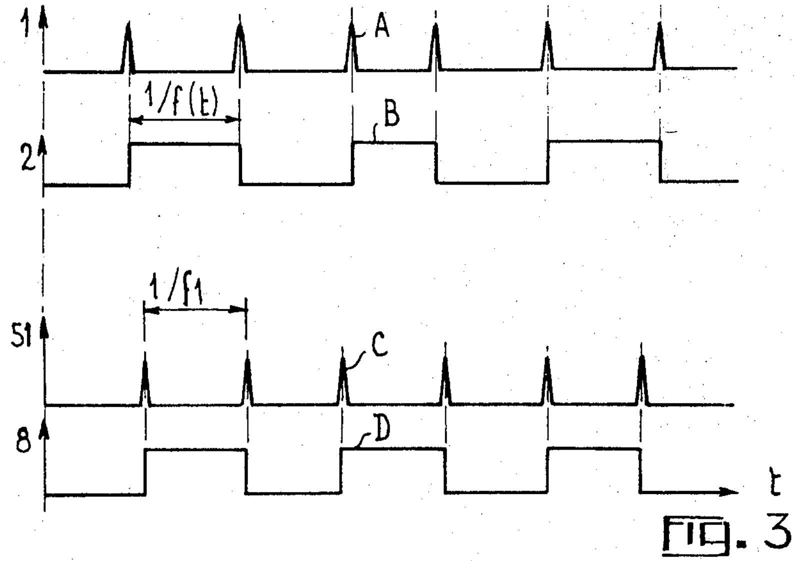
FIG. 3 is a set of graphs illustrating the output waveforms of different components of the recording device shown in FIG. 1.

The output of the first divider stage 51 delivers recurrent pulses, called reference signal, of frequency $f_1$, as shown in graph C of FIG. 3, to the trigger input T of a second symmetrically triggered bistable multivibrator 8 whose output is coupled to a second recording head 10, which receives a constant frequency square wave shown in graph D of FIG. 3.

Thus, if we disregard the timing signals which will be explained hereinbelow, the tape moving past the two recording heads 9 and 10 records respectively a variable frequency rectangular wave and a constant frequency ($f_{1/2}$) square wave on two parallel tracks as in a currently available stereophonic cassette recorder. Each positive half-period of these waves magnetizes the portion of the tape track that passes in front of the recording head air gap in a predetermined way. The negative half-periods of the square wave can be recorded either by a magnetization of equal magnitude but of opposite direction or by an absence of magnetization (obtained by means of erazing heads not shown), as the reproducing or playback heads will deliver in both cases a signal of the same waveform.

The first timing signals are delivered by a third multivibrator 7, which can be either a monostable or a bistable one, to the second input of AND gate 3 through an inverter 30 (or taken from the complementary output of the multivibrator). The third multivibrator is triggered through a NAND gate, composed of an AND gate 71 and an inverter 72, by pulses occuring at constant time intervals (for example every minute) delivered by the second stage 52 of the frequency divider chain 5. The duration of each first timing signal is determined either by the time constant of the coupling circuit of a monostable multivibrator, or by a recurrent pulse signal applied to the reset input C of a bistable one, the period of these pulses being equal to this duration. Such a recurrent pulse signal can be obtained from another output 55 of the frequency divider chain 5 delivering pulses of higher frequency than those from the second stage 52 output.

The recurrent timing pulses thus obtained periodically block AND gate 3, no signal is being transmitted to recording head 9 while they last. Another lower frequency second timing signal can be obtained by periodically interrupting the first timing signal for one recurrence.

This, for example, can be carried out every hour by means of NAND gate 71, 72, which receives hourly pulses from the third stage 53 of the frequency divider chain for blocking the transmission of the triggering pulses to the third multivibrator 8.

It is quite evident that the timing pulses can also be recorded on the second track, which records the reference frequency $f_1$.

The recording device of FIG. 1 further comprises a reset control circuit 6, which delivers reset pulses to each bistable stage 2, 7 and 8 including those of the frequency divider chain 5. The reset pulse applied to reset inputs C of bistable multivibrators 2, 7 and 8 triggers a change of state from "1" to "0" if they are not already in their "0" state, and applied to the reset inputs of a frequency divider chain 5 makes all the binary stages return to "0" state so as to give a new starting time to counter divider 5 delivering the counting pulses.

The reset pulse can either be generated manually by means of a push-button 62 triggering another bistable multivibrator 62 or supplied from an external source to resetting input 60 wherefrom it is fed to an amplifier 63, whose input is also connected to the output of multivibrator 61. Amplifier 63 distributes the reset pulses with sufficient amplitude to all the reset inputs as described above.

In a recording device according to the above described one tape speed was chosen to be 1.5 millimeters per second, the center frequency $f_o$ of the frequency modulated pulses was chosen equal to the frequency $f_1$ of the reference signal, both equal to 200 c/s. The frequency swing $KS_{max}$, where S max is the maximum absolute value of the signal S (t) to be recorded, is of the order of ± 80 c/s. The first timing signal inhibits recording for 20 milliseconds each minute, except on the hour (second timing signal).

Figure 2:
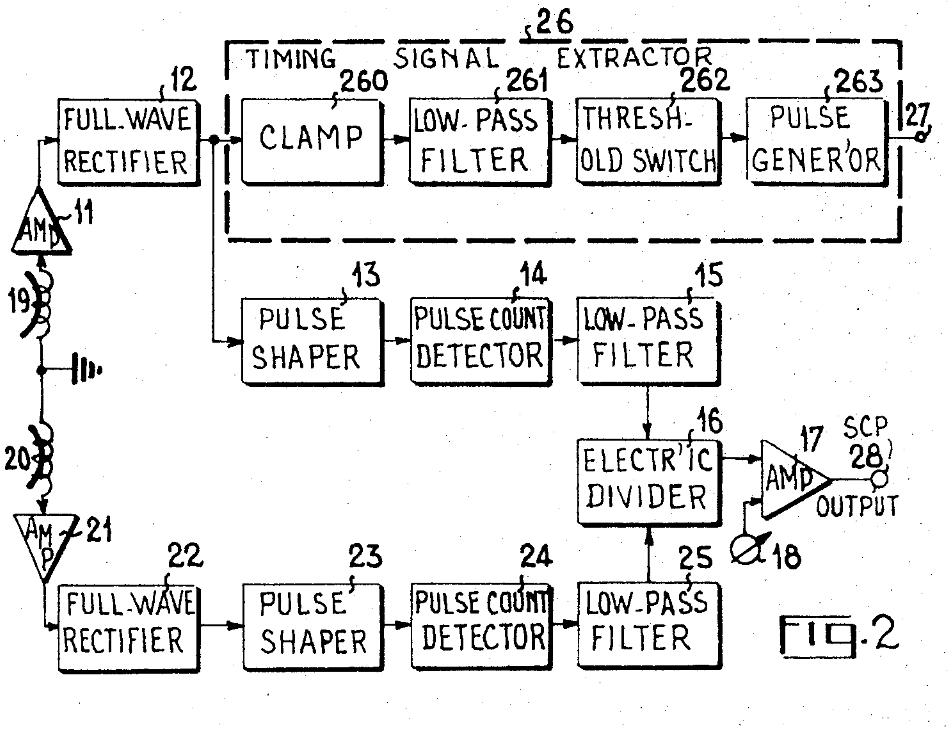
FIG. 2 is a block diagram of an embodiment of the playback section of the system in accordance with the invention.

FIG. 2 is the block-diagram of the playback or reproducing device of a system according to the invention. In this device the tape drive (not shown) provides a much faster tape motion than that of the recorder, it can, for example, use the tape drive of a commercial cassette recorder so that the ratio of playback to recording speed is approximately 30.

On FIG. 2, the reproducing device comprises a first or signal reproducing head 19 and a second or reference reproducing head 20 for respectively reproducing from the two parallel recorded tracks the frequency modulated and the constant frequency signal. The waveform of the output signals from the first playback head 19 are shown on graph E of FIG. 4, where the time-scale T corresponds to the playback tape velocity. For each positive-going transition of the recorded rectangular or square wave the heads deliver a positive pulse and each negative-going one gives rise to a negative pulse.

Figure 4:
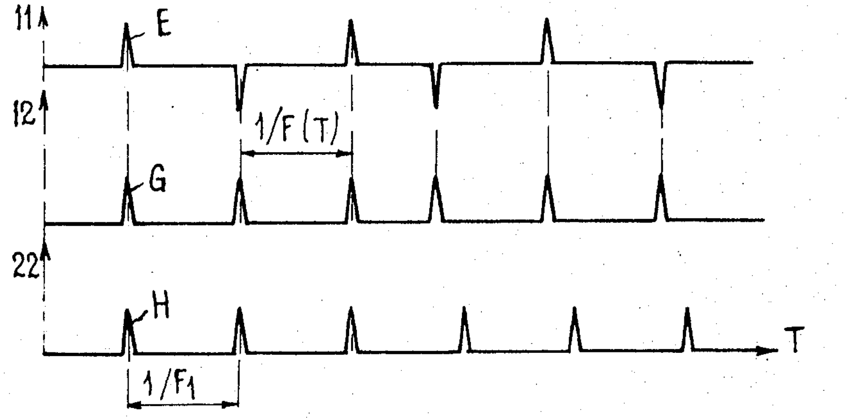
FIG. 4 is a set of graphs illustrating the output waveforms of different components of the reproducing device shown in FIG. 2.

The signal reproducing head 19 feeds a first amplifier 12 followed by a first full-wave rectifier 13, whose output delivers pulses of one predetermined polarity for both the positive and the negative ..... pulses applied to its input as shown on graph G of FIG. 4. These frequency modulated pulses are fed to a first pulse shaper 13 delivering short constant amplitude and duration pulses for each pulse occurring at its input. Such a pulse shaper 13 can for instance be made up from a monostable multivibrator or a blocking oscillator, driven by triggering pulses coming from rectifier 12.

It is to be noted that the rectifier 12 and pulse shaper 13 can be replaced by a single monostable multivibrator with double triggering, where the positive pulses from amplifier 11 are applied to the normally off control electrode and the negative one to the control electrode of the normally conducting stage, the output of amplifier 11 being respectively coupled to these electrodes by means of diodes.

The uniform frequency modulated pulses from pulse shaper 13 are fed to a first pulse count detector 14 or counter-type frequency discriminator. Such a circuit, also called pulse rate-meter or storage counter, comprises two diodes, a capacitor and a resistor shunting this capacitor, and its average output voltage is proportional to the frequency of the input pulses. The pulse count detector 14 output signal is fed, eventually through an operational amplifier (not shown), to a first low pass filter 15.

Similarly, the reference channel fed by the second playback head 20 comprises a second preamplifier 21, a second full-wave rectifier 22, a second pulse shaper 23, a second pulse count detector 24 and a second low pass filter 25 identical with the first ones.

Low-pass filters 15 and 25 respectively feed the first and second inputs of an electronic analogue divider circuit 16 delivering at its output a signal proportional to the ratio of the modulated pulse frequency to the reference pulse frequency, this division allowing the reduction or elimination of the wow induced error. Such a circuit is well known and usually comprises a multiplier, a differential and a high gain amplifiers. The divider feeds an output operational amplifier stage 17 having a control knob 18 for adjusting the zero value of the output signal KS (T), K being a constant.

The extraction of the timing pulses from the reproduced signal is obtained by means of timing signal separator 26 connected to the output of the full wave rectifier 12 and comprising, for example:

- a clamping circuit 260 for clamping positive pulse tops to ground,
- a low-pass filter or integrator 261 delivering,
- a negative voltage approximately equal to the pulse amplitude and presenting a time constant which is considerably greater than the duration of the reproduced pulses, but much smaller than the duration of the reproduced timing signal so that after the disappearance of the pulse, its output voltage rises fastly to zero volts, a threshold switch or voltage comparator 262 fed from the low-pass filter 261, comprising at least one active element (transistor) normally biased for conduction (saturation) and which is cut-off by the negative filter output voltage and delivering a negative output step voltage for each transition from cut-off to saturation and a positive one for each transition from saturation to cut-off and a monostable pulse generator (multivibrator or blocking oscillator) 263 triggered by one of the to above described step voltages and delivering timing pulses of predetermined amplitude and width to output 27 called timing output.

It is to be noted that the threshold device can be made up from a voltage triggered bistable or monostable multivibrator of the Schmitt type, for example, which if monostable can also replace pulse generator 263.

Other types of well known circuits can be used for timing signal extraction such as those operating in a manner similar to ones used for separating the field synchronization signal in television receivers.

It will now be shown, by means of very simple calculations, how the spurious frequency modulation created by the wow can be eliminated from or at least very much reduced in the reproduced signal:

The signal to be recorded S(t) frequency modulates a pulse generator which delivers pulses with an instantaneous frequency $f(t)$ which can be written:

$$f(t) = f_o\,[1 + K \cdot S(t)] \ldots \qquad \ldots (1)$$

where $f_o$ is the center frequency and K is a constant representing the frequency swing.

The nominal recording tape speed being $v_R$, the actual one is not constant and is in fact a function of time, which can be written :

$$v_r(t) = v_R \cdot [1 + w_r(t)] \ldots \quad \ldots (2)$$

$w_r$ being a random dimensionless function called the recording wow.

Let $L$ (t) be the length of tape separating two recorded pulses, which can be written :

$$L(t) = v_r(t)/f(t) = v_R/f_o[1 + w_r(t)]/[1 + k \cdot S(t)] \ldots \quad \ldots (3)$$

Playback tape motion is also affected by wow and if the nominal playback tape speed is $v_P$, the actual one can be writtent :

$$v_p(T) = v_P \cdot [1 + w_p(T)] \ldots \quad \ldots (4)$$

where $w_p$ is the wow of the reproducing apparatus, and $T$ being the playback time scale, considering the different recording and reproducing speeds, i.e., $T = t \cdot v_R / v_R$.

The frequency of the reproduced pulse signal can thus be written :

$$F(T) = v_p(T)/L(T) \ldots \quad \ldots (5)$$

Substituting (4) and (3) into (5) we get :

$$F(T) = v_P[1 + w_p(T)] \cdot f_o \cdot [1 + k \cdot S(T)]/v_R[1 + w_r(T)] \ldots \quad \ldots (6)$$

If, in a second track of the tape a constant frequency signal has been recorded, whose frequency is equal to $f_1$, on the playback side the corresponding reproduced pulses will be of frequency :

$$F_1(T) = v_P[1 + w_p(T)]/v_R[1 + w_r(T)] f_1 \ldots \quad \ldots (7)$$

The pulse count detectors 14 and 24 will deliver voltages respectively proportional to $f$(T) and $F_1$ (T).

If these voltages are fed to an analogue divider, its output signal can be written :

$$D(T) = K \cdot F(T)/F_1(T) \ldots \quad \ldots (8)$$

where $K$ is a constant of proportionality.

Substituting from (6) and (7) into (8) we get :

$$D(T) = K f_o [1 + k \cdot S(T)]/f_1 \ldots \quad \ldots (9)$$

wherefrom it can easily be seen that the wow functions $w_r$ and $w_p$ have been eliminated and that $D$ (T) is proportional to $S$(T) to within a constant equal to $K \cdot f_o / f_1$, which can easily be compensated for by calibrating the system by acting on the control knob of the output operational amplifier 17.

Of course, the invention is not limited to the embodiments described and shown which were given solely by way of example.

What is claimed is:

1. A magnetic recording and reproducing system including means for recording an electrical input signal on magnetic tape and means for reproducing from said tape an output signal corresponding to said input signal ;

said recording means comprising :

first means for driving said tape with a predetermined average recording speed ;

means for generating pulses frequency modulated by said input signal about a predetermined center frequency ;

a first bistable multivibrator symmetrically triggered by said frequency modulated pulses delivering a frequency modulated rectangular waveform ;

a first magnetic recording head for recording said rectangular waveform on a first track of said tape ;

means for generating constant frequency pulses ;

a second bistable multivibrator symmetrically triggered by said constant frequency pulses delivering a constant frequency square wave ;

a second magnetic recording head for recording said square wave on a second track of said tape parallel to said first track ; and said reproducing means comprising :

second means for driving said tape with a predetermined average reproducing speed ;

a first magnetic reproducing head for reproducing from said first track a first reproduced pulse waveform alternately comprising positive and negative pulses respectively corresponding to the positive and negative-going transitions of said recorded rectangular waveform ;

first means for generating pulses of constant amplitude and width fed by said first waveform ;

a second magnetic reproducing head for reproducing from said second track a second reproduced pulse waveform alternately comprising positive and negative pulses respectively corresponding to the positive and negative-going transitions of said recorded square wave ;

second means for generating pulses of constant amplitude and width fed by said second waveform ; wherein the improvement comprises in combination :

a first pulse rate detector for delivering a signal proportional to the repetition frequency of the pulses delivered by said first pulse generating means ;

a second pulse rate detector for delivering a signal proportional to the repetition frequency of the pulses delivered by said second pulse generating means ; and an electronic analogue divider respectively fed by said first and said second pulse rate detector for delivering said output signal, the latter presenting an amplitude versus time function proportional to within a constant to that of the input signal with a time scale corresponding to that of the input signal multiplied by the ratio of said reproducing to said recording average tape speeds, whereby said output signal is delivered substantially free from wow.

2. A system as claimed in claim 1, wherein said first and said second tape driving means are respectively arranged for producing different recording and reproducing average tape speeds, said latter one being greater than said first one.

3. A system as claimed in claim 1, wherein said frequency modulated pulse generating means are arranged for delivering pulses having a center frequency substantially equal to the frequency of the pulses delivered by said constant frequency pulse generating means.

4. A system as claimed in claim 1, wherein said recording means further comprise :

means for generating by frequency division from said constant frequency pulses at least one constant frequency recurrent rectangular signal of predetermined duration called timing signal;

gating means controlled by said recurrent timing signal and inserted respectively between one of said first and second bistable multivibrators and one of said first and second recording heads for interrupting the recording of one of said waveforms to be recorded for the duration of said timing signal ; and wherein said reproducing means further comprise :

means fed by one of said first and second reproducing heads for extracting said timing signal from one of said reproduced pulse waveforms including : ;

means fed by said one reproducing head for rectifying said reproduced pulse waveform ;

low-pass means for filtering the rectified waveform and for delivering a d. c. voltage approximating the amplitude of said rectified waveform, said filtering means having a time constant greater than the inverse of the average frequency of the reproduced signal and smaller than the duration of the timing signal multiplied by the ratio of said recording to said reproducing average tape speeds so that said delivered d. c. voltage tends towards zero value in the absence of a reproduced pulse waveform i.e. during the reproduction of said timing signal ;

and threshold means fed by said filtering means for delivering a step signal whenever said delivered d.c. voltage reaches a predetermined threshold value located between said reproduced pulse waveform amplitude and zero.

5. A system as claimed in claim 1, wherein said first and said second pulse generating means are respectively arranged for delivering pulses with constant amplitude and width for input pulses of both polarities.

* * * * *